INVENTORS.
MATTHEW J. RELIS
WILLIAM YUNI
BY Everett M Fraser
ATTORNEY

Aug. 2, 1960 M. J. RELIS ET AL 2,947,945

TIME DOMAIN FILTER

Filed Nov. 5, 1954 6 Sheets-Sheet 2

INVENTORS.
MATTHEW J. RELIS
WILLIAM YUNI
BY Everett M Fraser
ATTORNEY

Aug. 2, 1960 M. J. RELIS ET AL 2,947,945

TIME DOMAIN FILTER

Filed Nov. 5, 1954 6 Sheets-Sheet 3

INVENTORS.
MATTHEW J. RELIS
WILLIAM YUNI
BY Everett M. Fraser
ATTORNEY

INVENTORS.
MATTHEW J. RELIS
WILLIAM YUNI
BY Everett H. Fraser
ATTORNEY

INVENTORS.
MATTHEW J. RELIS
WILLIAM YUNI
BY Everett M Fraser
ATTORNEY

INVENTORS.
MATTHEW J. RELIS
WILLIAM YUNI
BY Everett M. Fraser
ATTORNEY

United States Patent Office 2,947,945

Patented Aug. 2, 1960

2,947,945

TIME DOMAIN FILTER

Matthew J. Relis, Bayside, and William Yuni, East Meadow, N.Y., assignors to Burroughs Corporation, Detroit, Mich., a corporation of Michigan Filed Nov. 5, 1954, Ser. No. 467,074

17 Claims. (Cl. 328—112)

Figure 1:
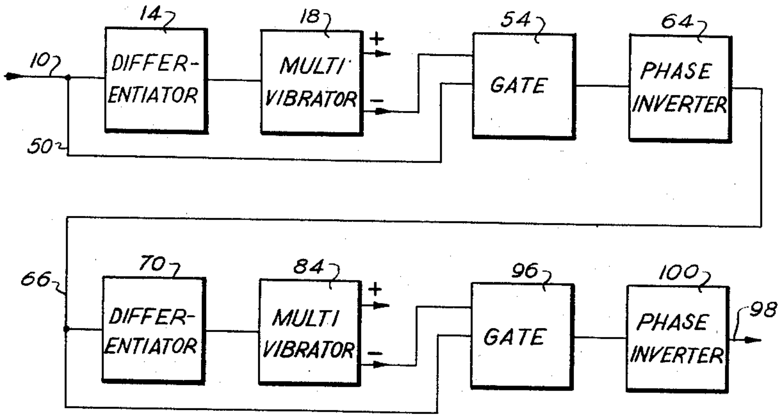

This invention relates to time domain filters and it is particularly concerned with means for discriminating between or selectively filtering electrical pulses of different durations.

In a system in which significant signal pulses have a minimum pulse duration greater than a time $\Delta T$ it may be desirable or necessary to suppress all pulses having a duration equal to or less than $\Delta T$.

This is especially true in devices for recognizing printed characters in which successive portions of each printed character are scanned by a photoelectric cell having a two-valued voltage output indicative of the black and white areas of the character. The device may identify characters by sampling the voltage output at selected points in the scan of the photoelectric cell. Dark flecks in the white areas and light spots in the printed dark areas will produce pulses in the output of the photoelectric cell which are shorter in duration than the pulses corresponding to the black and the white portions of the printed characters. These short pulses have no significance for the purpose of identifying the scanned characters and they may cause erroneous identifications. To insure reliable character identification it is necessary to eliminate those short pulses.

The necessity of preventing erroneous indications is also important in character recognition systems which measure the dimensions of the characters or which measure the thickness of the printed parts of the characters. Spurious black and white signals might otherwise prematurely initiate or terminate the measurements.

In a system in which positive-going wave forms represent an absence of light a short positive-going pulse will signal the scan of an unwanted black spot and may be termed a "pepper" pulse. A negative going pulse of short duration will signal the scan of an unwanted white spot and may be termed a "salt" pulse. The pepper and salt pulses resulting from these spurious black and white spots in and near the printed character must be eliminated to prevent the occurrence of erroneous signal pulses. It is necessary, however, to retain intact the longer pulses representing the occurrence of the black and white areas of the printed character so that character identification will not be impaired.

Prior systems have been devised which discriminate between or selectively filter pulses of different durations and give an output indicative of the occurrence of pulses having the desired durations. The pulses in the output of these systems, however, do not retain their respective original durations nor do they have durations corresponding to their original durations.

Another prior system has been devised in which the input wave train is passed through progressive stages of a delay network, with taps at the various stages leading to an output device. The output is initiated by the combined overlapping pulses from each stage and is terminated by the absence of pulses in at least two of the stages. This system will not suppress with precision all pulses shorter than a predetermined time, the predetermined time in this case being the maximum delay time. A sequence of very short pulses with a spacing approximately equal to the delay time of the stages of the delay network will produce an output. Short pulses close to the trailing edge of a long pulse appear in the output as an extension of the long pulse.

In many applications it is especially important, for the reasons mentioned above, that every pulse of less than a predetermined duration be eliminated. In these instances the prior systems just described have been found unsatisfactory.

Therefore, it is an object of this invention to provide an improved time domain filter for selecting those pulses exceeding a given duration from a mixture of electrical pulses which are of different durations, and for passing the selected pulses with durations which correspond to their respective original durations while suppressing all other pulses.

It is another object of this invention to provide a time domain filter for selecting all positive pulses in a pulse modulated wave train which are longer than a first predetermined duration and selecting all negative pulses in the wave train which are longer than a second predetermined duration, and passing these pulses with durations which correspond to their respective original durations.

A time duration $\Delta T_1$ may be determined which is longer than the duration of the majority of "pepper" pulses resulting from the scan of dark flecks in a white area. Similarly a time duration $\Delta T_2$ may be determined which is longer than the duration of a majority of the "salt" pulses resulting from the scan of white spots in a black area. $\Delta T_1$ and $\Delta T_2$ may or may not be equal but must be shorter than the durations of the significant pulses indicating the black and white areas of a printed character.

In accordance with the principle of the invention, all positive-going "pepper" pulses having a duration $\Delta T_1$ or less are eliminated by subtracting an amount $\Delta T_1$ from the leading edge of all positive-going pulses. An amount $\Delta T_1$ is then added to the trailing edge of each positive-going pulse. The result is a pulse train in which all pulses of duration $\Delta T_1$ or less are eliminated and all remaining pulses retain their original durations.

Negative-going "salt" pulses of duration $\Delta T_2$ or shorter are eliminated in a similar fashion by adding an amount $\Delta T_2$ at the trailing edge of each positive-going pulse, and the original durations of the remaining pulses then are restored by subtracting an amount $\Delta T_2$ from the leading edge of each pulse. This can be accomplished in the "pepper" eliminating circuit by inverting the phase of the input.

If the amount added back to each pulse in a "pepper" eliminating circuit differs from the initial subtracted amount $T_1$, the remaining pulses will have durations that differ from their respective original durations by a fixed amount.

The removal of salt and pepper pulses may be accomplished in a single circuit by subtracting the amount $\Delta T_1$ from the leading edge of the positive-going pulses, then simultaneously adding amounts $\Delta T_1$ and $\Delta T_2$ to the trailing edges, and thereafter subtracting a desired amount from the leading edge. The duration of the remaining pulses will be substantially unchanged if the amount finally subtracted is substantially equal to $\Delta T_2$.

Other objects and features of the invention will be pointed out in the following description and claims and illustrated in the accompanying drawings, which disclose, by way of examples, the principle of the invention and the best modes which have been contemplated of applying that principle.

Figure 3:
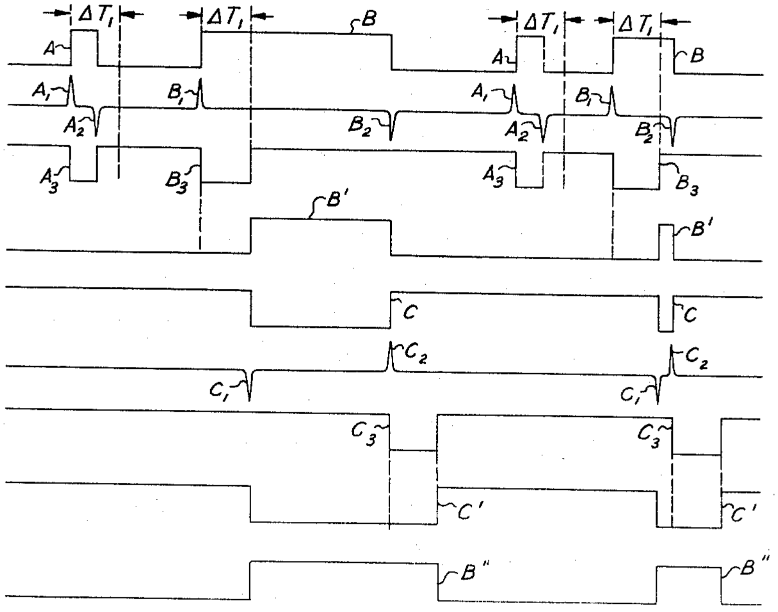
Figure 2:
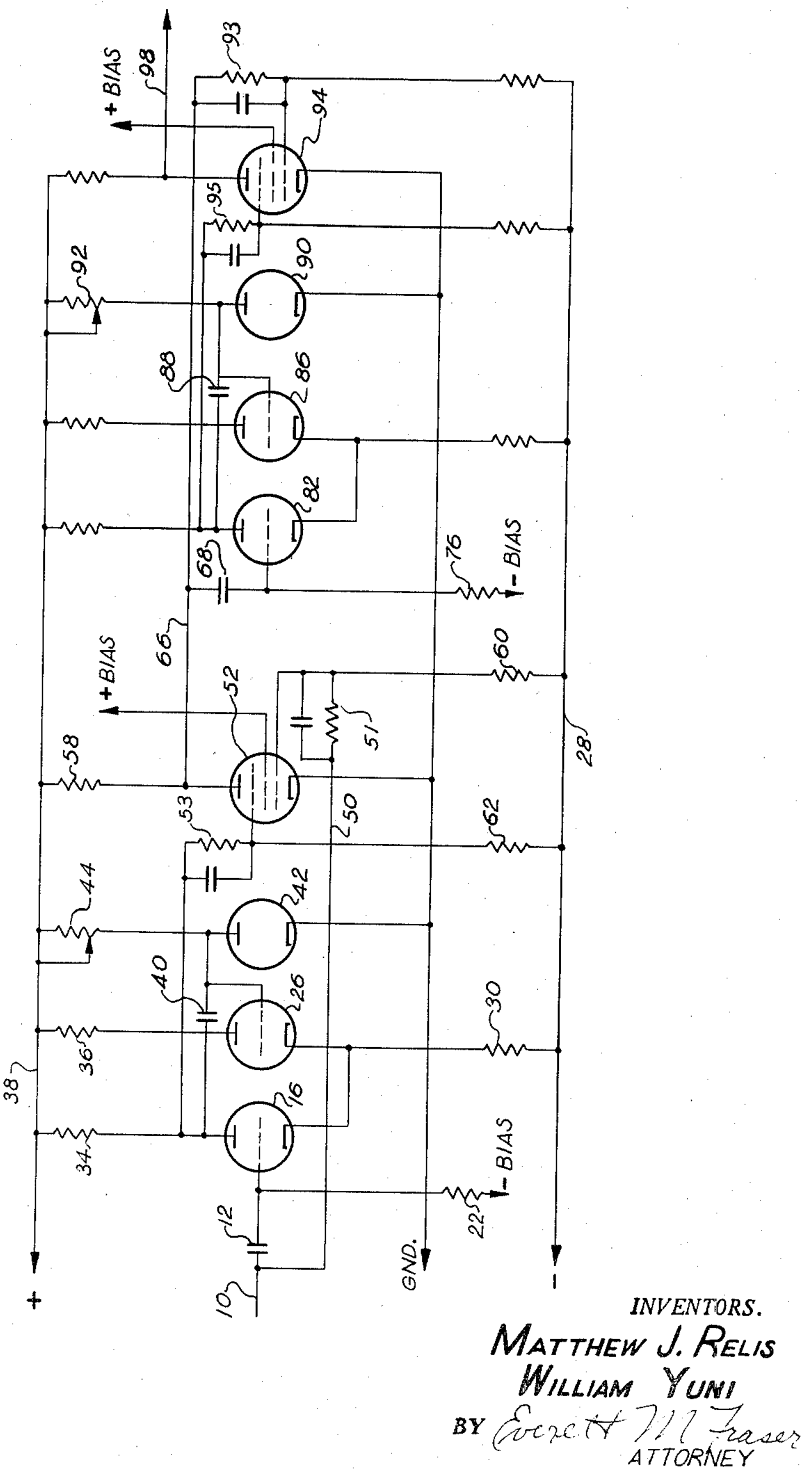
Figure 4:
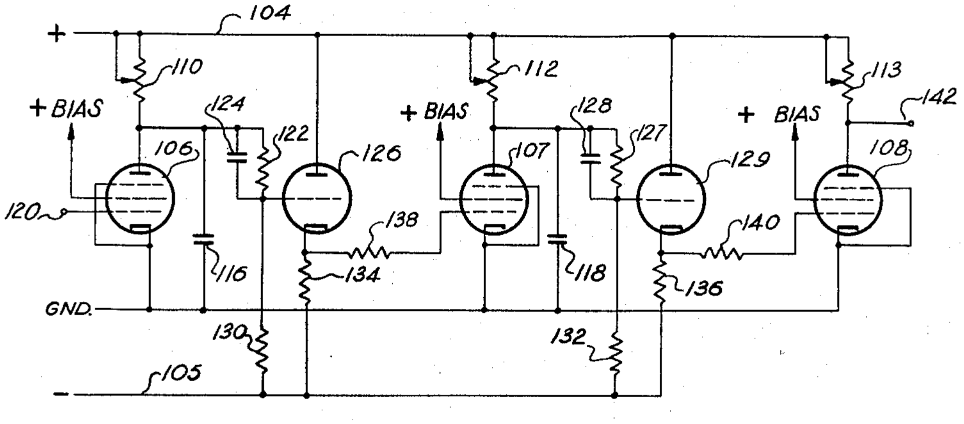
Figure 5:
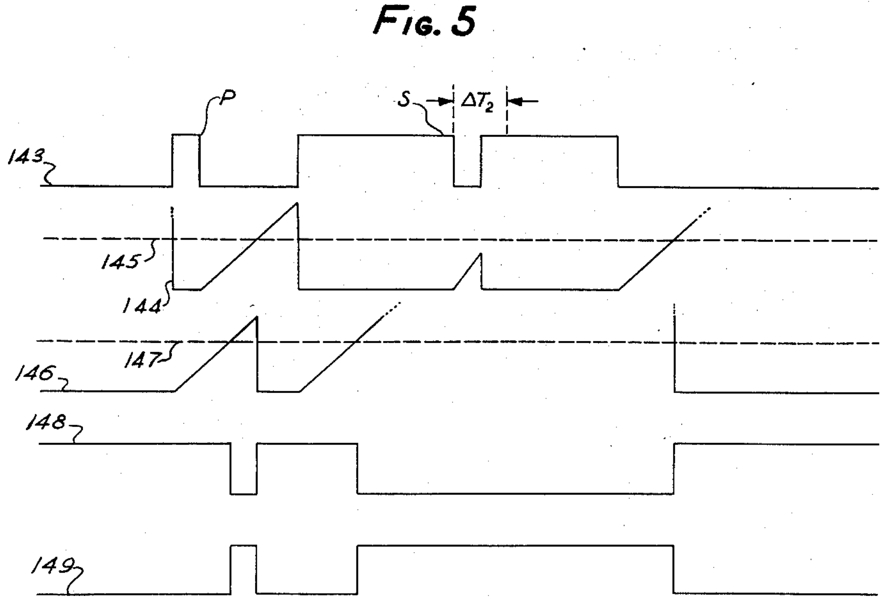
Figure 6:
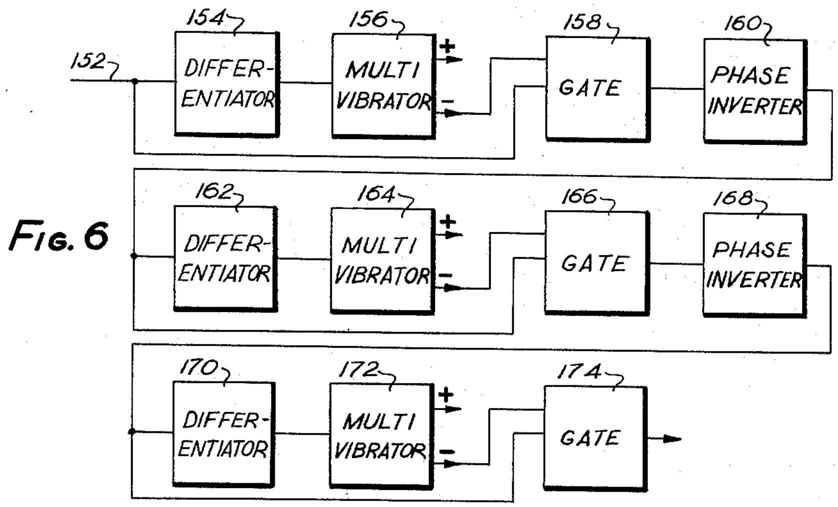
Figure 7:
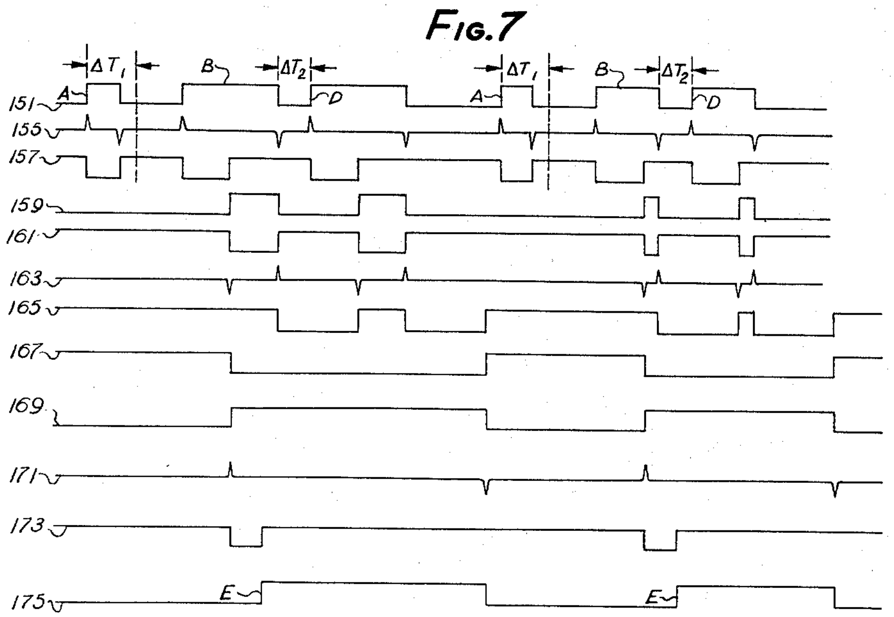
Figure 8:
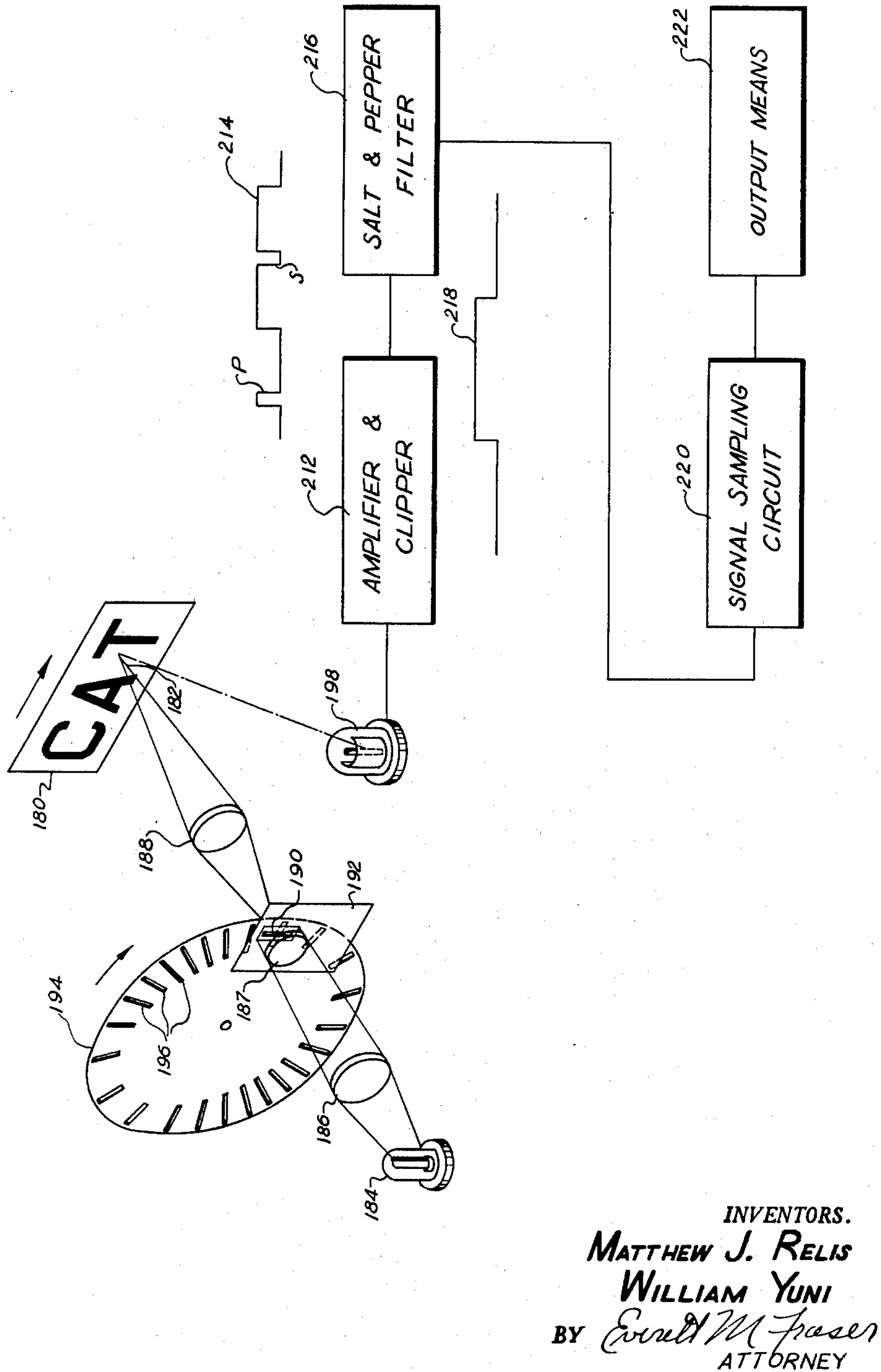
Figure 9:
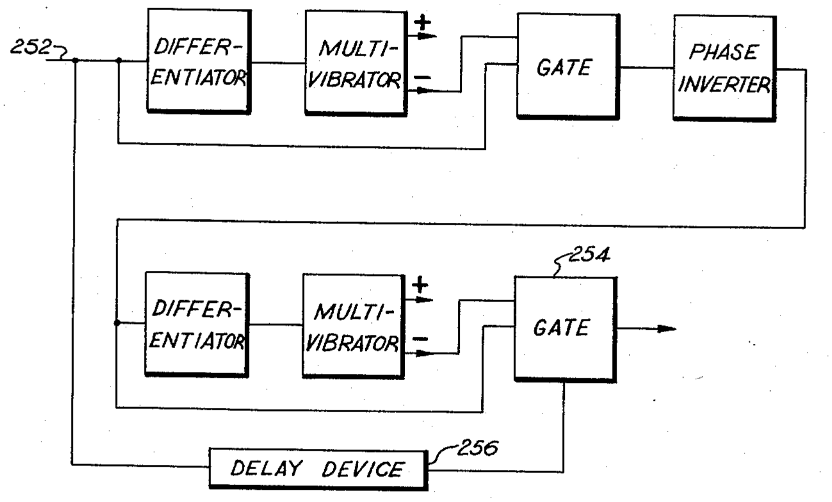
Figure 10:
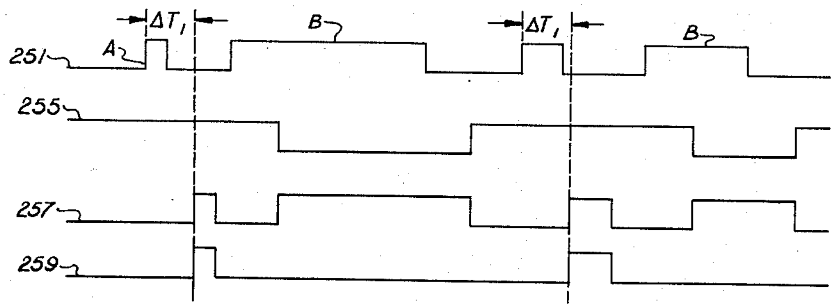

In the drawings:

Fig. 1 is a block diagram of a time domain filter circuit for eliminating pulses of a single polarity having less than a predetermined duration, in accordance with the principle of this invention, Fig. 2 is a schematic diagram of the circuit represented in Fig. 1, Fig. 3 is a graph of voltages illustrating the steps performed by the circuits of Figs. 1 and 2, Fig. 4 is a schematic diagram of an alternative form of time domain filter, Fig. 5 is a graph of voltages illustrating the steps performed by the circuit of Fig. 4, Fig. 6 is a block diagram of a time domain filter circuit for eliminating pulses of both positive and negative polarities having less than a predetermined duration, Fig. 7 is a graph of voltages illustrating the steps performed by the circuit of Fig. 6, Fig. 8 is a combined block diagram and schematic perspective view of a device utilizing the time domain filter, Fig. 9 is a block diagram of another embodiment of the invention for passing pulses of less than a predetermined duration, and Fig. 10 is a graph of voltages illustrating the steps performed by the circuit of Fig. 9.

Referring to Figs. 1, 2 and 3 the pulse modulated wave at input connection 10 is a two-valued signal in which positive pulses correspond to black and negative pulses correspond to white. The pulse train at the input is represented in Fig. 3 with the undesirable pepper pulses A shorter than $\Delta T_1$ and the long positive pulses B longer than $\Delta T_1$. The input pulses are passed through a condenser 12 of differentiator 14 to the grid of the first triode 16 of a multivibrator 18. A resistance 22 is connected between the grid side of the condenser and a source of negative grid potential. The input pulses are differentiated by the combination of the resistance 22 and the capacitance 12 of the differentiator 14 which generates sharp positive pulses $A_1$ and $B_1$ corresponding to the leading edges of the positive pulses A and B at the input and also generates sharp negative pulses $A_2$ and $B_2$ corresponding to the trailing edges of the positive pulses at the input.

Multivibrator 18 to which the differentiator output is applied is a monostable type and has a normally nonconducting triode tube 16 and a normally conducting triode tube 26. The cathodes of tubes 16 and 26 are connected to the negative power supply line 28 through a common resistor 30. The anodes of tubes 16 and 26 are connected respectively through resistances 34 and 36 to the positive power supply line 38. This circuit has two power supplies, supply line 38 being positive with respect to ground potential and supply line 28 being negative with respect to ground potential. The anode of tube 16 is also connected through a condenser 40 to the grid of tube 26. The grid of tube 26 is connected to the anode of a diode 42 which has its cathode connected to ground potential to act as a clamp to ground and its anode connected to the positive power supply line 38 through an adjustable resistance 44.

The trigger pulses generated by differentiator 14 are applied to the grid of tube 16. Positive trigger pulses on the grid of tube 16 cause initiation of current flow from anode to cathode of that tube. The cathode potential of tube 26 increases because of the increased current through resistor 30. The potential on the anode of tube 16 drops, driving the grid of tube 26 negative and thus the current from the anode to the cathode of tube 26 is interrupted. This quasi-stable state continues after removal of the positive differentiated pulse, in the absence of succeeding negative triggering pulses, until condenser 40 is sufficiently charged through resistor 44, to bring the grid potential of tube 26 close to the potential of its cathode. As its grid potential approaches the potential of the cathode, tube 26 resumes conducting, increasing the potential drop across cathode resistor 30 causing tube 16 to stop conducting.

Diode 42 is connected to the grid of tube 26 for the purpose of making the operation of the multivibrator 18 as independent as possible of the previous history of the input waveform. In the absence of the diode, when the multivibrator returned to its stable state, the grid and cathode of tube 26 would be driven positive beyond their normal levels and would then return exponentially to their normal levels. Both the ease with which the multivibrator could be triggered again to its quasi-stable state and the duration of the state would vary with the elapse of time since the previous return to the stable state. This variation would lead to faulty operation.

By introducing the diode 42, the grid of tube 26 of the multivibrator 18 is clamped to ground potential when the multivibrator returns to its stable state. The circuit of the multivibrator is designed so that the cathodes of tubes 16 and 26 are normally at ground potential. This makes the operation of the multivibrator upon the arrival of each triggering pulse as nearly independent as possible of its past operating history.

The duration of the quasi-stable state of the multivibrator 18 is dependent upon the charging time of condenser 40 through resistor 44. The resistor may be adjusted to give the desired time duration $\Delta T_1$ for the charge on condenser 40 to rise to the cutoff voltage level of tube 26, at which the multivibrator will return to its stable state. If the positive pulse at the input 10 has a duration less than $\Delta T_1$, however, the short negative triggering pulse generated by the differentiator 14 at the end of the short input pulse will return the multivibrator 18 to its stable state by extinguishing tube 16, thus almost instantaneously driving the anode of tube 16 and the control grid of tube 26 positive, causing tube 26 to conduct.

The output of the multivibrator 18 is taken from the anode of tube 16 and is a negative pulse $B_3$ equal in duration to $\Delta T_1$ if the input pulse has a duration $\Delta T_1$ or greater and is a negative pulse $A_3$ equal in duration to the input pulse if the input pulse is shorter than $\Delta T_1$. In both cases the leading edges of the negative pulses from the multivibrator are coincident in time with their respective leading edges of the positive pulses at the input.

A line 50 connects the circuit input 10 through a resistance-capacitance network 51 to the control grid of a pentode tube 52. The output of the multivibrator 18 at the anode of tube 16 is connected through a resistance-capacitance network 53 to the suppressor grid to tube 52, which performs the logical and gating function of gate 54 as well as the phase inversion function of the phase inverter 64.

Tube 52 has its cathode connected to ground potential and its anode connected to the positive potential line 38 through an anode resistor 58. The control and suppressor grids of pentode tube 52 are respectively biased by resistors 60 and 62 connected to the negative supply line 28. The screen grid is biased to a potential between that of ground and of the positive supply line.

Tube 52 is of the type in which, if either the control or the suppressor grid is negative with respect to the cathode beyond a certain voltage, the tube will not conduct no matter how positive the other grid is driven, provided the normal ratings of the tube are not exceeded. The control grid to tube 52 is cut off in the absence of signals and is driven up to zero bias or above by signals. The suppressor grid of tube 52 is at or above zero bias when multivibrator 18 has not been triggered, and is cut off when multivibrator 18 has been triggered. Only when a positive pulse exists at input 10 and multivibrator 18 has returned to its stable or untriggered state does current flow in the anode circuit of tube 52. The multivibrator output pulses $A_3$ in Fig. 3 are equal in duration to their respective positive "pepper" pulses A, which are therefore completely blocked. Negative pulses $B_3$ are of duration $\Delta T_1$, and therefore the positive input pulses B are blocked for that length of time. The resultant output of gate 54 is a pulse modulated wave with all "pepper" pulses A shorter than $\Delta T_1$ removed and all longer positive pulses B shortened at their leading edges by an amount $\Delta T_1$ giving the resultant pulses B′ shown in Fig. 3.

The gate 54 shown in the block diagram of Fig. 1 is a logical "and" gate which develops a positive output only when input voltages of positive polarity are simultaneously applied to the gates. The gate tube 52 in the schematic diagram combines the gate function of the gate 54 and the phase inversion function of the phase inverter 64 of the block diagram of Fig. 1, thus inverting pulses B′ to give negative output pulses C.

The output connection 66 of the phase inverter 64 corresponds to the output 66 taken from the anode of the gate tube 52 shown in Fig. 2 and is connected to the condenser 68 of a second differentiating circuit 70. The other side of condenser 68 is connected to the grid of the first triode tube 82 of a second multivibrator 84 and through a resistance 76 to a source of negative grid bias. The resistance 76 and the capacitance 68 form the differentiating circuit 70, which generates sharp negative and positive pulses, $C_1$ and $C_2$, respectively, marking the leading and trailing edge of each negative pulse C at the differentiator input connection 66. Because the pulse modulated wave was inverted the positive trigger pulses $C_2$ are coincident in time with the trailing edges of positive pulses B at the circuit input 10.

Multivibrator 84 is similar in construction and operation to the first multivibrator 18. It has two triode tubes 82 and 86, each having a cathode connected through a common resistance to the negative supply line 28 and each having an anode connected through a separate resistance to the positive supply line 38. Tube 86 is normally conducting. It has a grid connected through a condenser 88 to the anode of tube 82, which is normally cut off. The grid of tube 86 is also connected to the anode of diode 90, which has a cathode connected to ground potential. The anode of diode 90 is connected to the positive supply line through an adjustable resistance 92.

Diode 90 has the same function with respect to multivibrator 84 as diode 42 has with respect to multivibrator 18 as explained above.

Each positive trigger pulse $C_2$ from differentiator 70 causes multivibrator 84 to shift to its quasi-stable state. The value of the resistance 92 may be chosen so that the duration of the quasi-stable state is made substantially equal to the duration $\Delta T_1$ of the quasi-stable state of the first multivibrator 18.

The output of multivibrator 84 is taken from the anode of the normally cut off tube 82. The output is a negative pulse $C_3$ of duration $\Delta T_1$ having a leading edge which is coincident in time with the trailing edge of each negative pulse C at the output 66 of gate tube 52. The pulses C are applied to the control grid of a pentode tube 94 through a branch of connecting line 66 and a resistance-capacitance network 93. The output of multivibrator 84 is connected through a resistance-capacitance network 95 to the suppressor grid of tube 94 which acts as a second logical gate 96 and as a phase inverter 100.

Pentode tube 94 has its cathode connected to ground potential, its screen grid connected to a source of positive bias potential, and its control and suppressor grids biased through separate resistors to the negative supply line 28. The anode of tube 94 is connected to the positive supply line 38 through a resistor and is also connected to the circuit output 98.

Gate tube 94 operates in the same manner as gate tube 52. It conducts only with positive pulses on each of its control grids and is blocked by negative pulses on either one of the grids. Each negative pulse C applied to the tube from the output of gate tube 52 is extended for a time $\Delta T_1$ by a negative pulse $C_3$ from the multivibrator 84. Adding an amount $\Delta T_1$ to the trailing edge of each inverted pulse C produces the inverted pulses C′ equal in length to their respective input pulses B.

The phase of the wave train applied to gate tube 94 is reversed at the anode of the tube 20 that the wave train at the circuit output 98 is in phase with the wave train at the circuit input 10. This phase reversing function is represented in the block diagram of Fig. 1 by phase inverter 100 connected to the output of gate 96 and produces a pulse modulated wave with pulses B″ coincident in time with the inverted pulses C′.

The output of this circuit is, therefore, a pulse modulated wave in which each input pepper pulse A shorter than $\Delta T_1$ has been eliminated and each input pulse B longer than $\Delta T_1$ is passed with substantially unaltered length as a pulse B″.

The pulse eliminating filter disclosed above is essentially a two section filter. Each section contains a resistance-capacitance network coupled to a non-linear element which, together, in response to the application of the leading edge of each pulse, function to generate a wave having a predetermined variation of amplitude with respect to time. The non-linear element is provided to make either the charging or the discharging time constant as nearly instantaneous as possible.

Each section also contains an amplitude discriminator responsive to a predetermined amplitude of the generated wave for measuring the desired predetermined time interval by which each pulse is to be shortened or by which each pulse of the opposite polarity is to be lengthened.

In the pulse filter described above, the resistance-capacitance network in the multivibrator 18 includes the condenser 40 between the anode of the tube 16 and the grid of tube 26, and the resistance 44 connected between the condenser and the positive supply line 38. The grid to cathode path of tube 26 is the non-linear element which provides for a rapid charge of condenser 40 at each return of the multivibrator 18 to its stable state. At the application of each positive pulse to the grid of tube 16, the condenser 40 discharges at a substantially slower rate until it causes tube 26, which also functions as an amplitude discriminator, to conduct. The tube 16 functions as an amplifier, producing at the anode of the tube a pulse substantially equal in duration to the amount of time required for the condenser 40, after the application of an input pulse to the grid of tube 16, to discharge to the cutoff grid potential of tube 26. If the input pulse is shorter than this length of time, the output pulse at the anode of tube 16 is equal in duration to the duration of the input pulse as explained with reference to Fig. 2. In the circuit of Fig. 2 this output pulse of tube 16 is applied to a gate which, in effect, subtracts an amount of time equal to the duration of the multivibrator output pulse from the leading edge of the corresponding input pulse.

Fig. 4 is a schematic diagram of a circuit utilizing the same circuit elements in a different manner for filtering out short negative "salt" pulses. By inverting the input to the circuit the short positive "pepper" pulses could be filtered instead.

The circuit is of the type that has a positive power supply line 104 above ground potential and a negative power supply line 105 below ground potential. Three successive pentode tubes 106, 107 and 108 are utilized in the circuit. The anodes of the pentode tubes are connected to the positive power supply line through their respective variable resistors 110, 112 and 113. The suppressor grid and the cathode of each pentode tube are connected to ground potential. The screen grid of each pentode is connected to a source of positive potential.

The first two pentode tubes 106 and 107 each have a condenser, 116 and 118 respectively, connected between cathode and anode. The circuit input 120 is connected to the control grid of the first pentode 106. Pentode 106, resistor 110 and condenser 116 are arranged to function as a wave generator, as are pentode 107 along with its associated resistor 112 and condenser 118. To isolate each wave generator from the effect of grid current in the tube of the next succeeding wave generator, cathode followers are connected between them. The output at the anode of pentode tube 106 is connected through a resistor 122 and a parallel condenser 124 to the grid of the cathode follower tube 126. The anode of pentode tube 107 is similarly connected through resistor 127 and a parallel condenser 128 to the grid of the cathode follower tube 129. The grids of the two cathode follower triodes are biased through the respective resistances 130 and 132 to the negative supply line 105. The anodes of the two triodes are connected directly to the positive power supply line 104 and the cathodes are connected to the negative power supply line 105 through resistors 134 and 136. The cathode of the triode 126 is connected to the control grid of the pentode 107 through a resistor 138 and the cathode of triode 129 is similarly connected through resistance 140 to the control grid of the pentode 108. The circuit output 142 is taken from the anode of pentode 108.

In Fig. 5 a voltage graph of a typical input-wave 143 is shown having a short pepper pulse P, and a short salt pulse S which occurs in a longer positive black pulse. When this wave is applied to the input connection 120 of the circuit of Fig. 4, the leading edge of each positive pulse applied to the pentode tube 106 causes the tube to conduct, causing the rapid discharge of condenser 116 through the tube. At the termination of the positive pulse tube 106 stops conducting, permitting condenser 116 to be charged comparatively slowly through the anode resistor 110.

The voltage wave at the output of this wave generator is represented by the wave form 144 in Fig. 5. It retains the same shape after passing through the cathode follower tube 126 to the grid of tube 107. Pentode tube 107 serves as an amplitude discriminator, having a grid cutoff voltage at the level represented by the line 145. The high voltage portion of the wave form 144 above the cutoff voltage level of tube 107 is indicated by dotted lines.

The elapse of time after tube 106 stops conducting until the grid voltage of the next following pentode 107 rises to the cutoff level is the amount of time $\Delta T_2$ by which each negative input pulse is shortened. The short salt pulse S is shorter in duration than $\Delta T_2$ in the example shown. There is insufficient time for the grid voltage of tube 107 to rise to cutoff after the start of pulse S. The pulse S is consequently eliminated in the output of tube 107.

Tube 106 serves in this circuit as a non-linear element to provide a discharging time constant which is shorter than the charging time constant of the resistance and capacitance network 110 and 116. These elements function together as a wave-generator having a predetermined variation of amplitude with respect to time which can be changed by altering the variable resistance 110.

The pentode tube 107 serves as an amplitude discriminator responsive to a predetermined amplitude level of the wave generator and also as a second non-linear element for a second wave generator with resistance 112 and capacitance 118. The first wave generator and the amplitude discriminator together form the first section of the circuit.

All negative input pulses at the terminal 120 are shortened at the output of tube 107 by an amount $\Delta T_2$, or they are eliminated if they are shorter than $\Delta T_2$. The following second section of the salt eliminating circuit serves to lengthen the surviving shortened pulses.

As the grid voltage of pentode tube 107 rises above the cutoff level 145 the tube conducts, causing the rapid discharge of condenser 118. When the grid voltage falls below the cutoff level the tube 107 stops conducting, allowing condenser 118 to charge comparatively slowly through the anode resistor 112. Resistor 112, in this case, has been adjusted so that the time for condenser 118 to charge to the cutoff level of the third pentode equals $\Delta T_2$. The resulting voltage wave form 146 at the anode of tube 107 is shown in Fig. 5 in the voltage range below the cutoff level of the third pentode 108. It is not substantially altered by being passed through the cathode follower 129 which serves only to isolate the plate circuit of tube 107 from the grid circuit of tube 108.

Pentode tube 108 serves as an amplitude discriminator and amplifier. It has a negative pulse at its output whenever the voltage wave 146 at its grid exceeds its cutoff voltage level 147. The resulting wave form 148 at the circuit output 142 has been inverted in Fig. 5 to give a voltage wave graph 149 which is in phase with the input wave 143 for purposes of comparison. All pulses shorter than $\Delta T_2$ have been eliminated and all remaining pulses have been restored to their original duration.

Pentodes are utilized in this circuit to provide for sharp amplitude discrimination. Triodes can be used as the non-linear elements for discharging the condensers of the wave generators. Sharp amplitude discrimination could be provided in this case by a Schmidt trigger circuit connected to the output of each wave generator.

Diodes in series with the condensers could also be used as wave generators. The condenser could be quickly charged through the diode during a pulse of one polarity and could discharge comparatively slowly through a parallel resistance during a pulse of opposite polarity. A Schmidt trigger circuit connected to the output of each wave generator would also be useful in this circuit to provide the necessary amplitude discrimination.

By subtracting the amount $\Delta T_1$ from each positive pulse it is apparent that all pepper pulses with a length $\Delta T_1$ or less are eliminated. Adding an amount $\Delta T_1$ restores the original duration to each remaining pulse. The circuit can alternatively be adjusted to eliminate all pulses shorter than $\Delta T_1$, thus subtracting an amount $\Delta T_1$ from the leading edge of all remaining pulses, and then adding an amount $\Delta T_1'$, which is not equal to $\Delta T_1$, to the trailing edges of said remaining pulses. In this case the output pulse modulated wave corresponds to the input wave with all pulses shorter than $\Delta T_1$ filtered out and all pulses longer than $\Delta T_1$ lengthened in duration by a fixed amount algebraically equal to $\Delta T_1' - \Delta T_1$.

A circuit in which a different amount is added to the trailing edges of pulses than is removed from leading edges is described in the immediately following paragraphs.

It is apparent that undesired negative salt pulses with a length $\Delta T_2$ or less will be eliminated if the pepper eliminating operation described above is reversed and an amount $\Delta T_2$ is added to the trailing edge of each positive pulse. Subtracting $\Delta T_2$ from the leading edge will then restore the length of the pulses. This, of course, is equivalent to inverting the phase of the wave train containing the salt pulses so that they become positive pulses, and then removing them as pepper pulses.

The operations for removing both pepper pulses with a length $\Delta T_1$ or shorter and salt pulses with a length $\Delta T_2$ or shorter can be combined by first removing an amount $\Delta T_1$ from each positive pulse to eliminate pepper pulses, adding $\Delta T_1$ plus $\Delta T_2$ to each remaining pulse to eliminate salt pulses, and then subtracting the amount $\Delta T_2$ from each remaining pulse to restore its length.

The block diagram of a circuit for removing both salt and pepper pulses is shown in Fig. 6. It has three sections connected in cascade. Each of these sections has connected in cascade a differentiating circuit, a multivibrator, and a gate. A phase inverter is connected between each of the sections. The input to the differentiating circuit of each section is also connected to the gate of that section. The first two sections function in a manner similar to the circuit of Figs. 1 and 2 with the exception that the duration of the quasi-stable state of the second multivibrator is equal to $\Delta T_1+\Delta T_2$. The duration of the quasi-stable of the third multivibrator is equal to $\Delta T_2$. The operation of the circuit shown in Fig. 6 is more specifically described with reference to Fig. 7.

The pulse modulated input wave 151 has positive pepper pulses A, positive black pulses B longer than $\Delta T_1$ and negative salt pulses D. The input pulse train is applied through input connection 152 to the differentiating circuit 154 which generates positive and negative trigger pulses 155 marking respectively the leading and trailing edges of the positive pulses at the input.

The positive differentiated pulses are applied to trigger the multivibrator 156 to its quasi-stable state. The multivibrator will return to its stable state after a time $\Delta T_1$ or upon receipt of a negative triggering pulse before the elapse of time $\Delta T_1$. The multivibrator output 157 has negative pulses of a length $\Delta T_1$ starting coincident in time with the leading portions of the positive black pulses B, and also negative pulses coincident in length and time with positive pepper pulses A.

The negative pulses in the output wave 157 of the multivibrator 156 are applied to gate 158 to block the corresponding positive pulses in the input wave 151 which is coincidentally applied to the gate. In the resultant gate output 159 the pepper pulses A have been eliminated and the black pulses B have been shortened by an amount $\Delta T_1$.

Pulse train 159 is passed through phase inverter 160 to produce the inverted wave 161 which is then differentiated in the differentiator 162 of the second section of the circuit. The positive pulses of the differentiator output 163 trigger multivibrator 164 to generate negative pulses 165, each of which continues for a time $\Delta T_1+\Delta T_2$ or until receipt of a negative trigger pulse, if this occurs before the time $\Delta T_1+T\Delta_2$ elapses.

The multivibrator output 165 is applied to gate 166 so that the negative pulses block the gate to which the inverted pulse train 151 is applied. The gate output 167 has inverted pulses which are longer by an amount $\Delta T_2$ than their corresponding positive input pulses B. The salt pulses D have been eliminated.

The gate output wave 167 is inverted by phase inverter 168. The output 169 of phase inverter 168 is differentiated in differentiator 170 of the third circuit section. Each positive pulse of the differentiator output 171 triggers the multivibrator 172 to produce a negative pulse 173 with a duration $\Delta T_2$. These negative pulses are applied to gate 174 where they block the positive pulses of wave train 169, which are also applied to gate 174. Each positive pulse is thus shortened by an amount $\Delta T_2$.

The output 175 of the filter circuit has had eliminated from it all positive pepper pulses A and negative salt pulses D. Each positive black pulse B of the input wave is passed to the output as a positive black pulse E with a substantially unchanged length.

Although the circuit illustrated and described has the multivibrator and gates of the circuit shown in Figs. 1 and 2, the circuit of Fig. 4 can also be adapted to eliminate both salt and pepper pulses with the addition at the output of another circuit section having a wave generator and an amplitude discriminator.

An application of the time domain filter circuit to character recognition is shown in Fig. 8. A sheet or document 180 is passed through the scanning means of the character recognition device, which reads letters or numbers in a predetermined scanning area on the document. The document is fed (by means not shown) in the direction indicated by the arrow permitting the area thereon to be traversed by a rapidly moving light beam or "pencil" of light 182. The scanning spot projected on the document by the beam executes a rapid vertical scan. The slower horizontal scan is produced by the motion of the document.

A beam of light from the light source 184 is projected through the lenses 186 and 187 to an approximately vertical slit 190 in a stationary mask 192. Preferably the light source 184 comprises a lamp having a linear luminous area oriented parallel to the vertical slit 190. Just beyond the stationary mask 192 is a rotary scanning disc 194 having radial slits 196 therein near its periphery. The disc 194 is driven at a uniform speed causing each of the slits 196 in the disc in turn to pass the slit 190 in the stationary mask. The virtual light source, consisting of the parallelogram shaped opening which is defined by the crossed mask slit 190 and disc slits 196, moves in a straight line with approximately uniform motion and thus executes the vertical scan.

An image of the virtual light source is projected on the document by a lens 188, causing a moving spot of light to scan the document. The light reflected by the document is directed to a photocell 198. The photocell responds to generate a signal representing the variations in the reflectance of the surface as the scan spot moves across the area in which the character is contained. The output of the photocell 198 is amplified and clipped in the amplifying circuit 212. Taking the letter T, Fig. 8, as an example of the letter being scanned, the output voltage of the amplifying circuit will vary in the manner illustrated by wave form 214 during the period when a scanning spot is performing its vertical scan across the horizontal bar at the top of the letter T.

The negative portions of the voltage output of the amplifier represent the white areas traversed by the scanning spot and the positive portions of the voltage wave correspond to the traversed black areas. The short positive-going pulse P in the wave form 214 is a pepper pulse corresponding to the scan of a dark fleck in a white area. The short negative-going pulse S occurs in the long "black" pulse and is a salt pulse corresponding to a white spot in the printed area of the cross bar at the top of the letter T. The pulses P and S must be removed to prevent erroneous identification of the printed character.

The output of the amplifier 212 is then applied to the salt and pepper filter 216 illustrated in Fig. 6. The salt and pepper filter removes the undesirable short positive and negative pulses P and S in the manner described with reference to the circuit of Fig. 6 and has an output wave form 218, therefore, which corresponds to the correct nature of the portion of the letter being scanned. The output of the salt and pepper filter is then applied to a signal sampling circuit 220 for character identification. The output of the signal sampling circuit is applied to an output means 222 which may be a printer or a recorder or any other desired output utilization circuit.

Where a positive pulse shorter in length than $\Delta T_1$ is separated from a longer positive black pulse by an interval shorter than $\Delta T_2$ the short positive pulse may be the result of scanning a dark fleck or the result of scanning a portion of a black area cut off by a white spot from the remainder of the black area. The circuit illustrated in Fig. 6 removes all short positive pulses before filling in the salt pulses and consequently would pass only the longer pulse in this case.

If the salt eliminating circuit preceded the pepper eliminating circuit, however, the interval between the two positive pulses would be filled in first, leaving no pepper pulse to remove.

Determination of whether the salt eliminating circuit or the pepper eliminating circuit should be first in the cascade depends on analysis of the source of signals and of the system to determine which mode of operation will yield the more correct results. For example, if it is more probable to have a pepper pulse immediately precede the beginning or immediately follow the end of a positive signal pulse than to have a salt pulse immediately follow the leading edge or immediately precede the trailing edge, of a positive signal pulse, the pepper circuit should precede the salt circuit.

Various kinds of filters may be made in accordance with the principle of this invention. In Fig. 9 is shown a time domain filter for passing with unaltered durations all pulses equal to or shorter than a predetermined duration and for stopping all pulses of greater duration.

The circuit of Fig. 9 contains a pepper eliminating circuit similar to that illustrated in Fig. 1. The pepper eliminating circuit has two sections, each section having a differentiator, multivibrator and a gate. A phase inverter is connected between the two sections. These components are connected and function in the same manner as the components of the pepper eliminating circuit of Fig. 1. A delay device 256 is connected between the filter input 252 and the last gate 254; it is a third input to the last gate 254.

A pulse modulated input wave 251 is shown in Fig. 10 with pepper pulses A having a duration $\Delta T_1$ or less and longer pulses B which, in this instance, are to be eliminated. With this wave train applied to the input 252, as explained with reference to the circuit of Fig. 1, the output of the second gate 254 would be an inverted wave 255 free of the pepper pulses of the input wave, if the delay device 256 were to produce a steady positive signal to the gate 254. The longer pulses which remain in the wave 255 are delayed by an amount of time $\Delta T_1$ and have the same length as their corresponding pulses B at the input. The input wave 251 is delayed by an amount of time $\Delta T_1$ without alteration in form by delay device 256, through which it is applied from the circuit input to the second gate 254. The output wave 257 of the delay device 256 is blocked at the gate by the inverted filtered wave 255. The pulses longer than $\Delta T_1$ in wave forms 255 and 257 are matched in time; such pulses are blocked from the output of gate 254. The pepper pulses with durations $\Delta T_1$ or shorter do not appear in wave form 255 and therefore are passed to the circuit output 258 in the output wave 259.

By this method, or by delaying the input to a salt eliminating circuit by an amount $\Delta T_2$, or by delaying the input to a combined salt and pepper eliminating circuit by an amount $\Delta T_1+\Delta T_2$, and then combining in proper polarity or gating the delayed input with the output wave train, time domain filters can be synthesized which pass with unaltered lengths all pulses of a given polarity having duration shorter than the delay time for the given polarity.

For example, the salt eliminating circuit shown in Fig. 4 could pass all negative input pulses shorter than a time $\Delta T_2$ by combining the inverted pulse train at the output of the circuit with the suitably delayed pulse train taken from the circuit input to cancel all negative pulses longer than $\Delta T_2$.

These circuits may be combined to make pass filters which pass with unaltered durations all positive pulses or negative pulses or both, whose durations lie within certain predetermined bands; or they may be combined to stop all pulses whose durations lie within certain predetermined bands, and to pass all other pulses with unaltered durations.

Table 1 shows, for example, how pulse passing filters for passing only pulses which lie in a certain range of durations, or pulse rejection filters for rejecting pulses which lie within a certain range of durations, may be synthesized from the basic circuits already described. To simplify the table, the various types of pulse filters will be called band-pass, band-rejection, low-pass and high-pass filters, borrowing from the terminology of wave filters.

*Table I*

| Function | Component Sections | Interconnection of Component Sections | Remarks |
|---|---|---|---|
| Band pass | One high pass<br>One low pass | Cascade | Passes pulses $\Delta T$ of duration $\Delta T_1<\Delta T<\Delta T_2$ where $\Delta T_1$ is the duration of the shortest pulse passed by the high pass section and $\Delta T_2$ is the longest pulse passed by the low pass section. |
| Band Rejection. | One high pass<br>One low pass | Parallel | Rejects pulses $\Delta T$ of duration $\Delta T_1<\Delta T<\Delta T_2$ where $\Delta T_1$ is the duration of the longest pulse passed by the low pass section and $\Delta T_2$ is the duration of the shortest pulse passed by the high pass section. |

By passing a signal through a cascade of salt and pepper circuits, a delay network can be made with a total delay $\Delta T_1+\Delta T_2+ \ldots \Delta T_n$ which rejects all pepper pulses equal to or shorter than $\Delta T_p$ where $\Delta T_p$ is the largest of the delay times applicable to pepper pulses, and which rejects all salt pulses equal to or shorter than $\Delta T_q$ where $\Delta T_q$ is the largest delay time applicable to salt pulses. In the special case where $$\Delta T_1=\Delta T_2= \ldots \Delta T_n=\Delta T$$

the circuit rejects all salt and pepper pulses of duration $\Delta T$ and shorter and has a total delay $n\Delta T$ where $n$ is the number of such circuits in cascade. The delay per salt or pepper cascade must always be less than the minimum duration of the pulses to be passed. There is no theoretical limit, however, to the number of stages which may be cascaded.

A whole hierarchy of time domain filters may be devised, built about a pulse eliminating circuit of the type described which, in response to input pulses having a duration greater than a predetermined duration, subtracts an amount from each of the pulses equal to the predetermined duration, and in response to pulses having a duration equal to or less than the predetermined duration subtracts an amount from each of the pulses equal to the duration of the pulse, thereby eliminating them, and which then adds to desired amount to each remaining pulse.

It is apparent that a summing circuit followed by an amplitude discriminator can be substituted for each coincidence gate specified as a component of the circuits described above.

It is also apparent that shortening or eliminating pulses of a given polarity by subtracting an amount from the leading edge of each pulse of the given polarity and shortening or eliminating pulses of a given polarity by adding an amount to the trailing edge of each pulse of opposite polarity are identical operations, differing only in the terminology used to describe them.

While there have been shown and described the fundamental novel features of the invention as applied to several preferred embodiments thereof, it will be understood that various omissions and substitutions and changes in the forms, details and operations of the devices illustrated may be made by those skilled in the art, without departing from the spirit of the invention.

It is the intention, therefore, to be limited only as indicated by the scope of the claims appended hereto.

I claim:

1. A time domain pulse filter for eliminating from a pulse wave all pulses shorter than a desired duration comprising first means to eliminate all pulses having a duration less than the desired duration by shortening the duration of each of the pulses in said pulse wave by an amount equal to said desired duration, and second means fed by said first means to lengthen the duration of each remaining pulse by an amount substantially equal to said desired duration to substantially restore each shortened pulse to its original duration.

2. A time domain pulse filter for eliminating from an input pulse train all pulses shorter than a desired duration comprising first means responsive to one of the edges of each input pulse to generate a wave having a predetermined variation of amplitude with respect to time, amplitude discriminating means responsive to a predetermined amplitude of said wave to measure a first interval of time equal to said desired duration after the occurrence of the said edge of each input pulse, second means controlled by said amplitude discriminating means to shorten each pulse of said input pulse train by an amount equal to said first interval of time to eliminate all pulses shorter than said desired duration, time measuring means to measure a second interval of time, and third means responding to said time measuring means to lengthen each of said surviving shortened pulses by an amount equal to said second interval of time so that each surviving pulse is lengthened by an amount equal to the second interval of time minus the first interval of time.

3. A time domain pulse filter for eliminating from a pulse train all pulses shorter than a desired duration comprising resistance-capacitance means coupled to a non-linear element responsive to the application of one edge of each pulse to initiate the generation of a wave having a predetermined variation of amplitude with respect to time, amplitude discriminating means responding to a predetermined amplitude of said wave to measure an elapse of time equal to said desired duration after the occurrence of said edge of each input pulse, means responding to said amplitude discriminating means to shorten each pulse of said pulse train by an amount equal to said elapsed time to eliminate all pulses shorter than said desired duration, a second resistance-capacitance means coupled to a second non-linear element responsive to the application of one edge of each surviving shortened pulse to initiate the generation of a second wave having a predetermined variation of amplitude with respect to time, a second amplitude discriminating means responding to a predetermined amplitude of said second wave to measure a second elapse of time after the occurrence of the said edge of each surviving shortened pulse, and means responding to said second amplitude discriminating means to lengthen each of said surviving shortened pulses by an amount equal to said second elapsed time so that each lengthened pulse has a duration differing from its original duration by a fixed amount.

4. A time domain pulse filter for eliminating from a pulse train all pulses of a given polarity shorter than a desired duration comprising a first pulse blocking device to which said pulses are applied, first means to render said device effective for blocking pulses at the initiation of each pulse in said train for a time interval equal to said desired duration or for a time interval equal to the duration of the pulse if said pulse is shorter than the desired duration to eliminate each pulse whose durations does not exceed said desired duration and to shorten all longer pulses by said desired duration, a second pulse blocking device fed by said first blocking device, and second means to render said second blocking device effective for blocking pulses for a second desired interval of time at the initiation of each pulse of opposite polarity to said second blocking device to lengthen each surviving shortened pulse of said given polarity.

5. A time domain pulse filter for eliminating from an input pulse train all pulses shorter than a first desired duration comprising a first generating means responsive to the application of each pulse of said input pulse train to generate a blocking pulse equal in duration to said first desired duration or to the duration of the input pulse if the input pulse is shorter than said first desired duration, a first gating means coupled to receive input pulse train and fed by said first generating means to block the pulses of the input pulse train for the duration of each blocking pulse to eliminate all input pulses shorter than said first desired duration to shorten each longer pulse by an amount equal to said first desired duration, first phase inverting means fed by said first gating means, a second generating means responsive to each pulse of the inverted output of the first gating means to generate a blocking pulse equal to a second desired duration or equal to the duration of the pulse of the said inverted output if the pulse is shorter than the second desired duration, a second gating means coupled to said first phase inverting means and to said second generating means to block each pulse from said first phase inverting means for the duration of each signal from said second generating means to eliminate all pulses from said first phase inverter that are shorter than the second desired duration and to shorten each pulse longer than said second desired duration by an amount equal to said second desired duration, and second phase inverting means fed by said second gating means to present a pulse train where all input pulses shorter than said first desired duration have been eliminated and all longer pulses have been lengthened by an amount equal to the second desired time interval minus the first desired time interval.

6. A time domain pulse filter for eliminating from an input pulse train all pulses of a given polarity shorter than a first predetermined duration and all pulses of the opposite polarity shorter than a second predetermined duration comprising first means to shorten each of said pulses of a given polarity by an amount equal to said first predetermined duration to eliminate all pulses of the given polarity shorter than said first desired duration, second means to lengthen each of the shortened pulses of the given polarity by an amount equal to the first desired duration plus the second desired duration to eliminate all pulses of the opposite polarity shorter than said second desired duration, and third means to shorten each of the lengthened pulses by an amount substantially equal to said second desired duration to restore substanstantially to its original duration each input pulse which was not eliminated.

7. A time domain pulse filter for eliminating from an input pulse train all pulses of a given polarity shorter than a first predetermined duration and all pulses of the opposite polarity shorter than a second predetermined duration comprising a first pulse blocking device to which said input pulses are applied, first means to render said first pulse blocking device effective upon the application to it of each input pulse of a given polarity for a time interval equal to said first predetermined duration or for a time interval equal to the duration of the pulse if said pulse is shorter than the first predetermined duration to eliminate said shorter pulses and to shorten all longer pulses of the given polarity, a second pulse blocking device fed by said first pulse blocking device, second means to render said second pulse blocking device effective upon the application to it of each pulse having opposite polarity for an interval of time equal to said first predetermined duration plus said second predetermined duration or for the duration of said pulse of opposite polarity at the filter input if the pulse is shorter than the sum of said predetermined durations to eliminate all pulses of said opposite polarity which are shorter than said second predetermined duration and to shorten all surviving pulses of said opposite polarity, a third pulse blocking means to which the output of the second pulse blocking third means is applied, and means to render said third pulse blocking means effective upon the application to it of each surviving pulse of the given polarity for a time interval substantially equal to said second predetermined duration to restore the surviving pulses of both polarities to substantially their original duration.

8. A time domain pulse filter for eliminating from an input pulse train all pulses of a given polarity shorter than a first predetermined duration and all pulses of the opposite polarity shorter than a second predetermined duration comprising a first time measuring means responsive to the application of each pulse of said given polarity to measure a first time interval equal to said first predetermined duration, means responsive to the first time measuring means to shorten each of the pulses of the given polarity by an amount equal to the first time interval to eliminate all pulses shorter than said first predetermined duration, a second time measuring means responsive to the application of each surviving shortened pulse of the said given polarity to measure a second time interval equal to the first predetermined duration plus the second predetermined duration, means responsive to the second time measuring means to lengthen each surviving shortened pulse of said given polarity by an amount equal to the second time interval to eliminate all pulses of said opposite polarity shorter than said second predetermined duration, a third time measuring means responsive to the application of each lengthened pulse of said given polarity to measure a time interval substantially equal to said second predetermined duration, and means responsive to the third time measuring means to shorten each of the surviving lengthened pulses of said given polarity by an amount substantially equal to said second predetermined duration to restore substantially all surviving pulses of both polarities to their respective original durations.

9. A time domain pulse filter for eliminating from an input pulse train all pulses of a given polarity shorter than a first predetermined duration and all pulses of the opposite polarity shorter than a second predetermined duration comprising a first generating means responsive to the application of each pulse of said given polarity to generate a blocking pulse equal in duration to said first predetermined duration or to the duration of the input pulse of said given polarity if the input pulse is shorter than the first predetermined duration, a first gating means through which said input pulse train is passed unchanged in the absence of blocking pulses, means to apply the blocking pulses from said first generating means to said first gating means to block from the output of said first gating means for the duration of each blocking pulse each input pulse of said given polarity to eliminate all input pulses of the given polarity shorter than said first predetermined duration and to shorten each longer pulse by an amount equal to said first predetermined duration, a first phase inverting means at the output of said first gating means, a second generating means responsive to each pulse of said given polarity of the inverted output of the first gating means to generate a blocking pulse equal in duration to the first predetermined duration plus the second predetermined duration or equal to the duration of the inverted pulse of the said given polarity if the pulse is shorter than the first predetermined duration plus the second predetermined duration, a second gating means through which the inverted output of the first gating means is passed unchanged in the absence of blocking pulses, means to apply the blocking pulses from said second generating means to said second gating means to block from the output of said second gating means for the duration of each blocking pulse each pulse of the said inverted output to eliminate all pulses of the inverted output shorter than the said second predetermined duration and to shorten each longer pulse of the inverted output by an amount equal to the said second predetermined duration, a second phase inverting means at the output of the second gating means to restore the pulse train to its original phase, a third generating means responsive to each pulse of said given polarity and restored phase to generate a blocking pulse substantially equal in duration to said second predetermined duration, a third gating means through which the output of the second phase inverting means is passed unchanged in the absence of blocking pulses, and means to apply the blocking pulses from said third generating means to said third gating means to block from the output of the third gating means for the duration of each blocking pulse each pulse of restored phase to restore substantially the surviving pulses of both polarities to their respective original durations.

10. In a character recognition device in which printed characters are identified by sampling or measuring the pulse modulated wave output of a scanning device which progressively scans the printed areas, a time domain filter for eliminating spurious pulses from the output wave, said spurious pulses being shorter than a predetermined duration, comprising first means to shorten each pulse of said pulse modulated wave by an amount equal to said predetermined duration to eliminate all pulses shorter than said predetermined duration, and second means fed by said first means to lengthen each surviving shortened pulse by a desired amount so that each surviving pulse at the output of said time domain pulse filter differs in duration from its respective duration at the filter input by a fixed amount.

11. In a character recognition device in which printed characters are identified by sampling or measuring the pulse modulated wave output of a scanning device which progressively scans the printed areas, a time domain filter for eliminating spurious pulses from the said output wave, said spurious pulses being shorter than a predetermined duration, comprising first means to shorten each pulse of said pulse modulated wave by an amount equal to said predetermined duration to eliminate all pulses shorter than said predetermined duration, and second means to lengthen each surviving shortened pulse by an amount substantially equal to said predetermined duration to substantially restore each surviving pulse to its respective original duration.

12. In a character recognition device in which printed characters are identified by sampling or measuring the pulse modulated wave output of a scanning device which progressively scans the printed areas, a time domain filter for eliminating spurious pulses of a given polarity from the output, said spurious pulses being shorter than a predetremined duration, comprising a first pulse blocking device to which said pulse modulated wave is applied, first means to render said device effective for blocking pulses at the initiation of each pulse of the given polarity for a time interval equal to said predetermined duration or for a time interval equal to the duration of the pulse if the said pulse is shorter than the predetermined duration to eliminate each pulse whose duration does not exceed said predetermined duration and shortening all longer pulses by said desired duration, a second pulse blocking device fed by said first blocking device and second means to render said second blocking device effective for blocking pulses at the initiation of each pulse of the opposite polarity for a time interval substantially equal to said predetermined duration to restore each surviving pulse to its original duration.

13. In a character recognition device in which printed characters are identified by sampling or measuring the pulse modulated wave output of a scanning device which progressively scans the printed areas, a time domain pulse filter for eliminating from said scanning device output wave spurious pulses of a given polarity, said spurious pulses of given polarity being shorter than a first predetermined duration, and for eliminating spurious pulses of the opposite polarity, said spurious pulses of opposite polarity being shorter than a second predetermined duration, comprising means to shorten each pulse of the given polarity in said pulse modulated wave by an amount equal to said first predetermined duration to eliminate all pulses of the given polarity shorten than said predetermined duration, means to lengthen the surviving shortened pulses by an amount equal to the first predetermined duration plus the second predetermined duration to eliminate all pulses of the opposite polarity shorter than said second predetermined duration, and means to lengthen each of the surviving shortened pulses of opposite polarity by an amount substantially equal to said second predetermined duration to restore substantially each surviving pulse to its respective duration at the output of said scanning device.

14. In a character recognition device in which printed characters are identified by sampling or measuring the pulse modulated wave output of a scanning device which progressively scans the printed areas, a time domain pulse filter for eliminating from said scanning device output wave spurious pulses of a given polarity, said pulses of a given polarity being shorter than a first predetermined duration, and for eliminating spurious pulses of the opposite polarity, said spurious pulses of opposite polarity being shorter than a second predetermined duration, comprising a first generating means responsive to the application of each pulse of said given polarity to generate a blocking pulse equal in duration to said first predetermined duration or to the duration of the input pulse of said given polarity if the input pulse is shorter than the first predetermined duration, a first gating means through which said input pulse train is passed unchanged in the absence of blocking pulses, means to apply the blocking pulses from said first generating means to said first gating means to block from the output of said first gating means for the duration of each blocking pulse each input pulse of said given polarity to eliminate all input pulses of the given polarity shorter than said first predetermined duration and to shorten each longer pulse by an amount equal to said first predetermined duration, a first phase inverting means at the output of said first gating means, a second generating means responsive to each pulse of said given polarity of the inverted output of the first gating means to generate a blocking pulse equal in duration to the first predetermined duration plus the second predetermined duration or equal to the duration of the inverted pulse of said given polarity if the pulse is shorter than the first predetermined duration plus the second predetermined duration, a second gating means through which the inverted output of the first gating means is passed unchanged in the absence of blocking pulses, and means to apply the blocking pulses from said second generating means to said second gating means to block from the output of said second gating means for the duration of each blocking pulse each pulse of the said inverted output to eliminate all pulses of the inverted output shorter than the said second predetermined duration and to shorten each longer pulse of the inverted output by an amount equal to said second predetermined duration, a second phase inverting means at the output of the second gating means to restore the pulse train to its original phase, a third generating means responsive to each pulse of said given polarity and restored phase to generate a blocking pulse substantially equal in duration to said second predetermined duration, a third gating means through which the restored phase output of the second gating means is passed unchanged in the absence of blocking pulses, and means to apply the blocking pulses from said third generating means to said third gating means to block from the output of the third gating means for the duration of each blocking pulse each pulse of restored phase to restore substantially the surviving pulses of both polarities to their respective original durations.

15. A time domain pulse filter for eliminating from a pulse train all pulses longer than a predetermined duration comprising shortening means to shorten each pulse of said pulse train by an amount equal to said predetermined duration to eliminate all pulses shorter than said predetermined duration, lengthening means to lengthen all surviving shortened pulses by an amount equal to said predetermined duration to restore each surviving pulse to its original duration, said pulses being delayed by an amount equal to said predetermined duration, delay means connected to the input of said pulse filter to delay the pulse train by a time interval equal to said predetermined duration, and means to combine in opposition the outputs of said lengthening means and said delay means, whereby all pulses shorter than the predetermined duration are passed with durations equal to their respective durations at the pulse filter input and all longer pulses are eliminated.

16. A time domain pulse filter for eliminating from a pulse train all pulses longer than a first predetermined duration and all pulses shorter than a second predetermined duration comprising a first shortening means to shorten each pulse of said pulse train by an amount equal to said first predetermined duration, a first lengthening means to lengthen all surviving shortened pulses by an amount equal to said first predetermined duration, delay means connected to the input of said pulse filter to delay the pulse train by a time interval equal to said first predetermined duration, first means to combine in opposition the outputs of said first lengthening means and said delay means to pass with unchanged durations all pulses in the input pulse train which are shorter than said first predetermined duration and to eliminate all longer pulses, a second shortening means to shorten each pulse surviving at the output of the combining means by an amount equal to said second predetermined duration to eliminate all pulses shorter than said second predetermined duration, and second means to lengthen each shortened pulse surviving at the output of the second shortening means by an amount substantially equal to said second predetermined duration, whereby all pulses passed to the output of said pulse filter retain substantially their respective original durations.

17. A time domain pulse filter for eliminating from a pulse train all pulses which are longer than a first predetermined duration and shorter than a second predetermined duration comprising a first shortening means to shorten each pulse of said pulse train by an amount equal to said first predetermined duration, a first lengthening means to lengthen all surviving shortened pulses by an amount equal to said first predetermined duration, a first delay means connected to the input of said pulse filter to delay the pulse train by a time interval equal to said first predetermined duration, combining means to combine in opposition the outputs of said first lengthening means and said first delay means to pass with unchanged durations all pulses in the input pulse train which are shorter than said first predetermined duration and to eliminate all longer pulses, a second shortening means to shorten each pulse of said pulse train by an amount equal to said second predetermined duration to eliminate all pulses shorter than said second predetermined duration, a second lengthening means to lengthen each shortened pulse surviving at the output of the second shortening means by an amount substantially equal to said second predetermined duration to restore substantially to their respective original durations all surviving pulses passed to the output of said second lengthening means, and means to add in phase the output of said second lengthening means to the output of said combining means to pass all surviving pulses with substantially their respective original durations.

References Cited in the file of this patent

UNITED STATES PATENTS

| | | |
|---|---|---|
| 2,118,626 | Smith | May 24, 1938 |
| 2,418,127 | Labin | Apr. 1, 1947 |
| 2,522,551 | Williams | Sept. 19, 1950 |
| 2,534,264 | Hoeppner | Dec. 19, 1950 |
| 2,572,080 | Wallace | Oct. 23, 1951 |
| 2,577,827 | Tompkins | Dec. 11, 1951 |
| 2,589,833 | Longmire et al. | Mar. 18, 1952 |
| 2,619,542 | Carver | Nov. 25, 1952 |

FOREIGN PATENTS

| | | |
|---|---|---|
| 162,395 | Australia | Jan. 15, 1953 |
| 506,793 | Canada | Oct. 26, 1954 |